Oct. 2, 1962 — G. A. LYON — 3,056,367
METHOD OF MAKING WHEEL COVERS
Filed Dec. 11, 1958 — 4 Sheets-Sheet 1
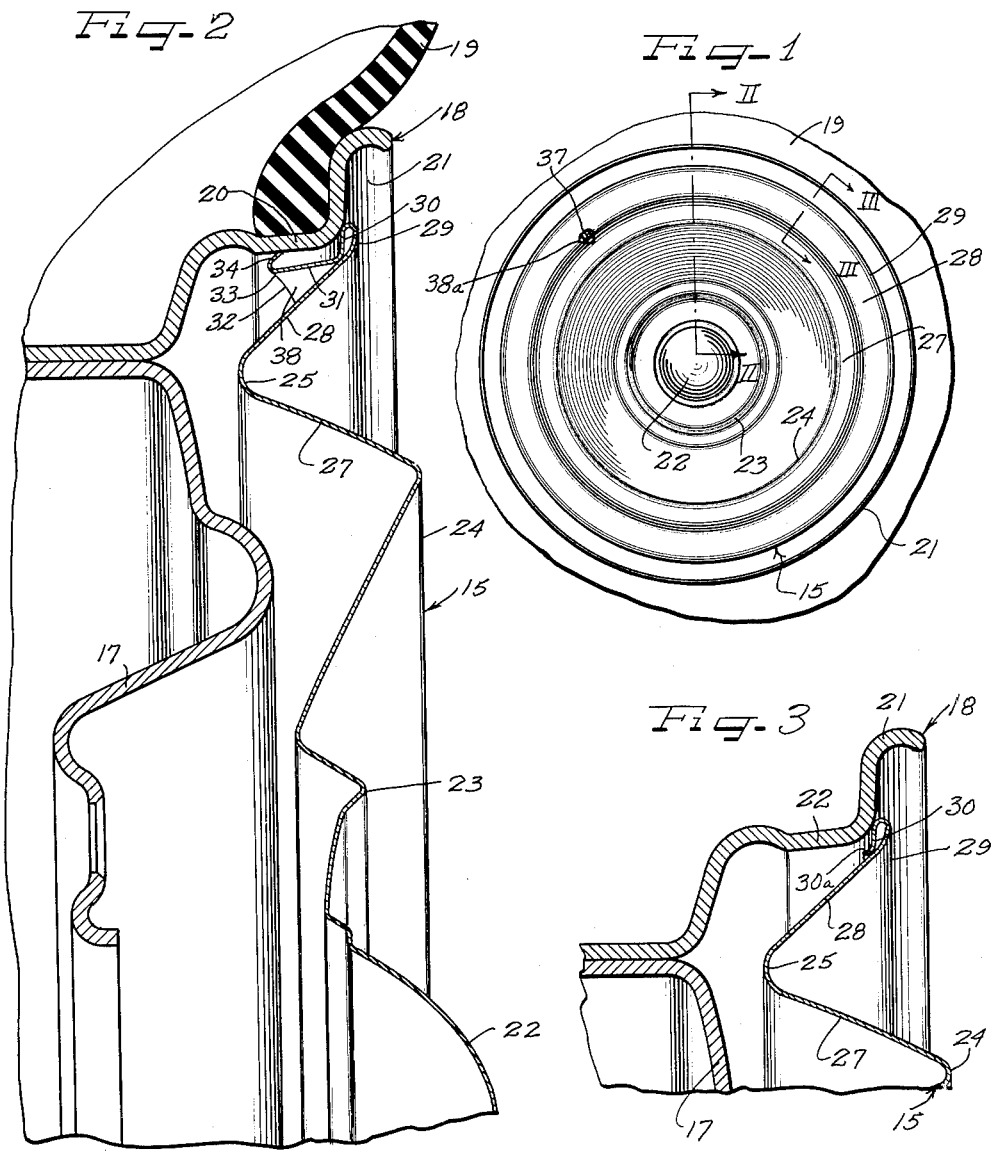
Inventor
George Albert Lyon
by Hill, Sherman, Meroni, Gross & Simpson  Attys.

Oct. 2, 1962 G. A. LYON 3,056,367
METHOD OF MAKING WHEEL COVERS
Filed Dec. 11, 1958 4 Sheets-Sheet 2
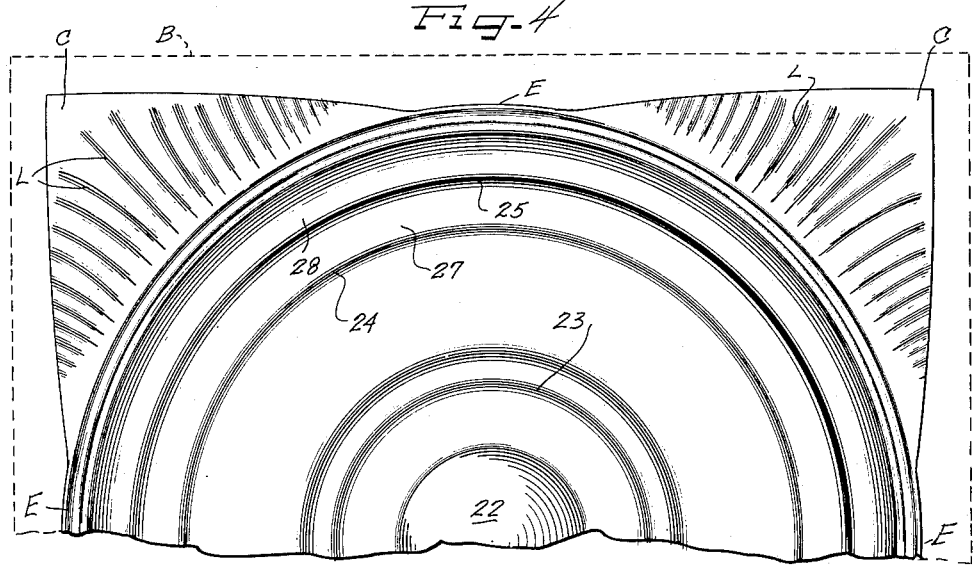
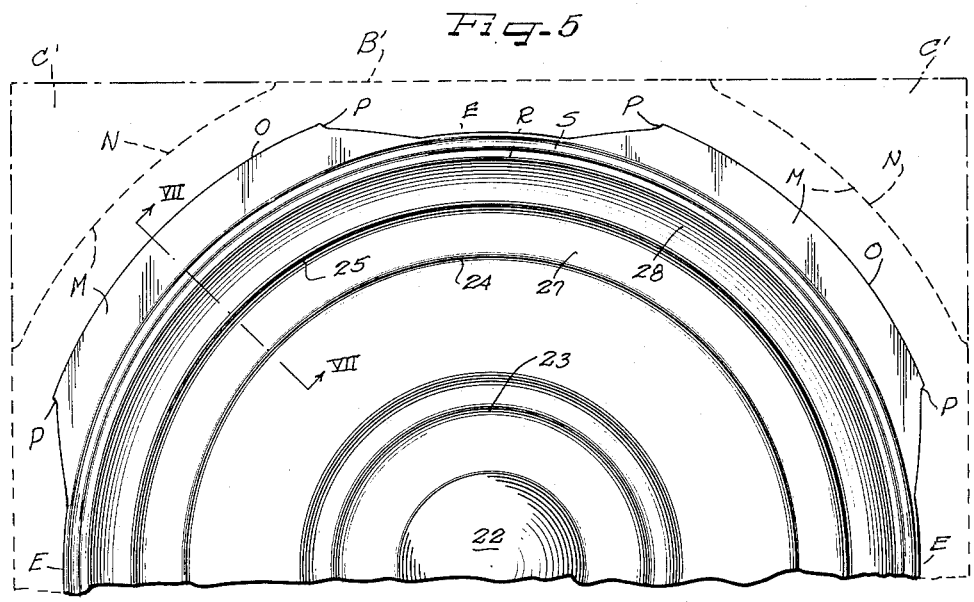
Inventor
George Albert Lyon Oct. 2, 1962 G. A. LYON 3,056,367
METHOD OF MAKING WHEEL COVERS
Filed Dec. 11, 1958 4 Sheets-Sheet 3
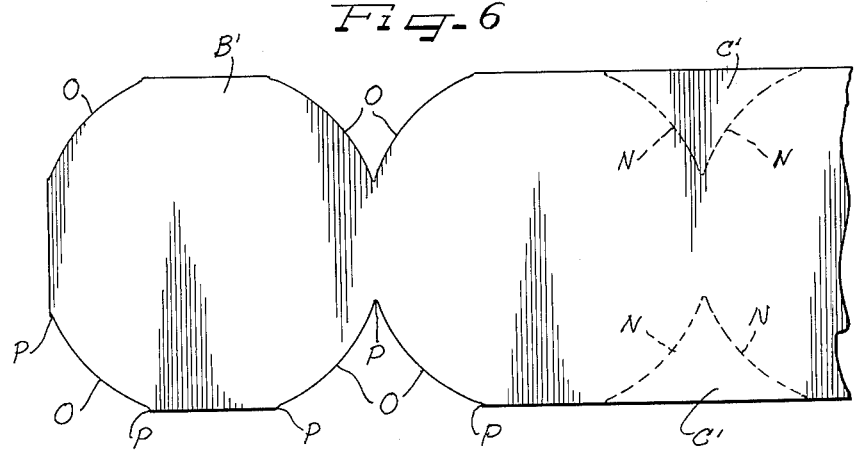
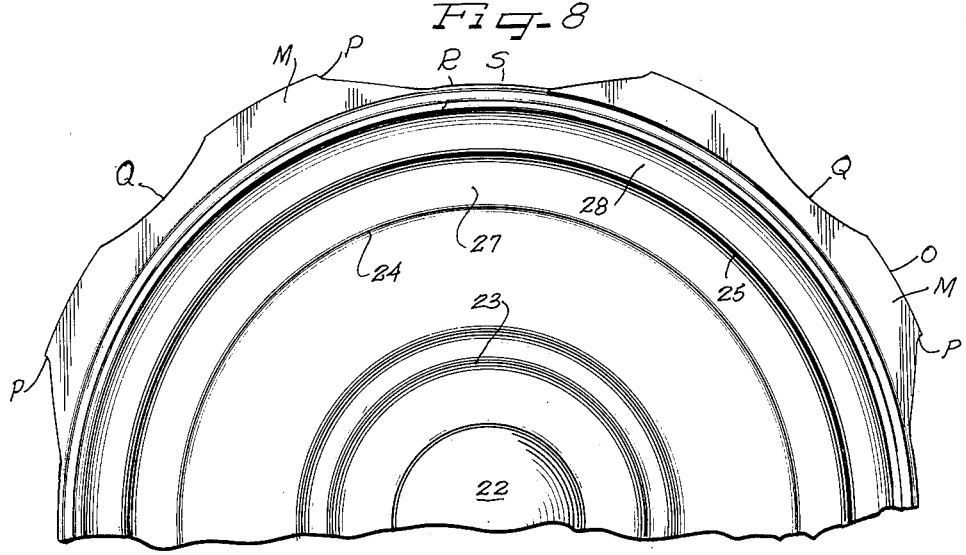
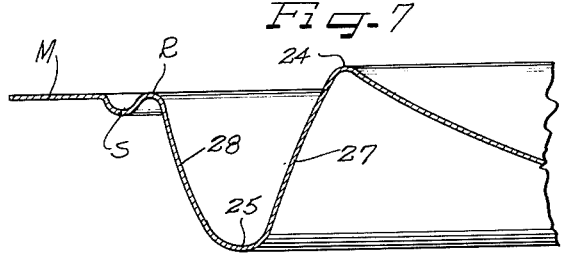
Inventor
George Albert Lyon
By Hill, Sherman, Meroni, Gross & Simpson Attys.

Oct. 2, 1962            G. A. LYON            3,056,367
METHOD OF MAKING WHEEL COVERS
Filed Dec. 11, 1958            4 Sheets-Sheet 4
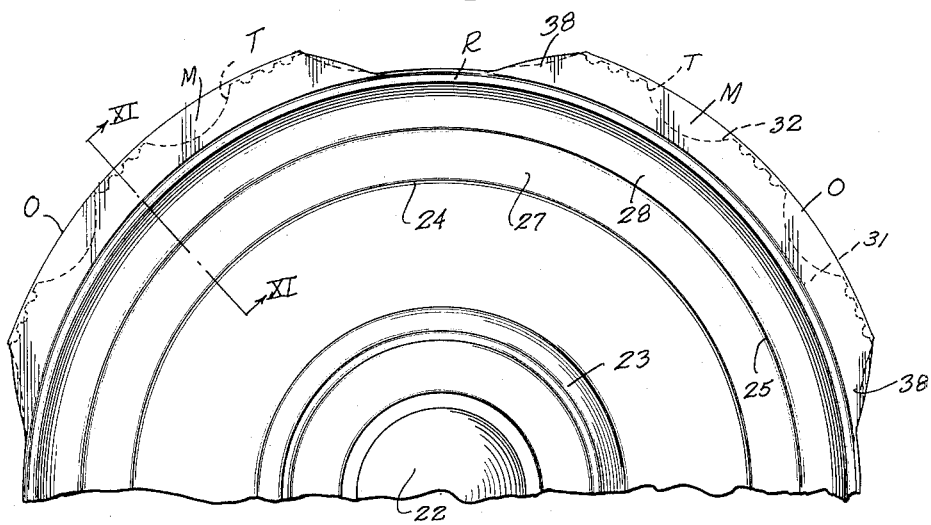
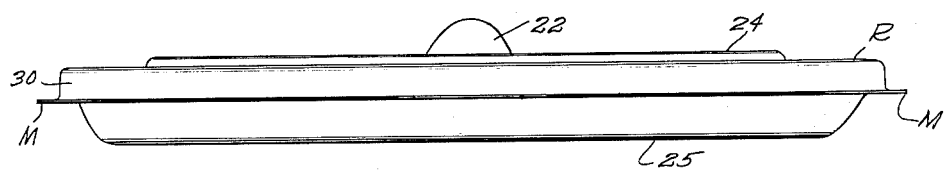
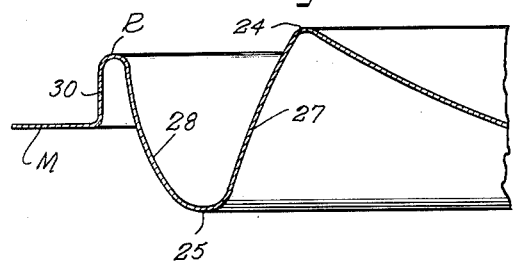
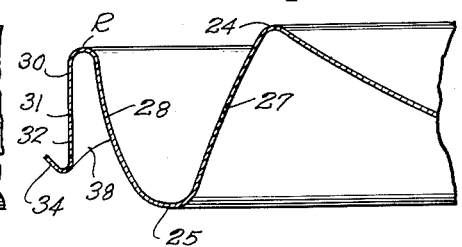
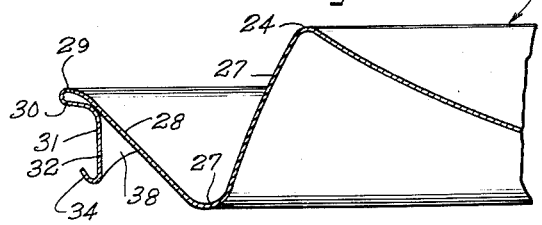
Inventor
George Albert Lyon
by Hill, Sherman, Meroni, Gross & Simpson Attys.

United States Patent Office 3,056,367
Patented Oct. 2, 1962

3,056,367
METHOD OF MAKING WHEEL COVERS
George Albert Lyon, Detroit, Mich., assignor to Lyon Incorporated, Detroit, Mich., a corporation of Delaware
Filed Dec. 11, 1958, Ser. No. 779,707
5 Claims. (Cl. 113—51)

The present invention relates to improvements in methods of making wheel covers from thin sheet metal, and more particularly relates to the efficient and economical drawing of such wheel covers.

In the drawing of sheet metal wheel covers of the type provided with self-retaining radially outer marginal circumferentially spaced series of spring finger extensions, substantial waste in trimmed-off scrap material has generally been experienced. This has, of course, resulted in a cost factor reflected in the price at which such wheel covers could be supplied to the users.

It has been deemed in prior practice inevitable that there be substantial scrap loss in trimming away a large proportion of a substantial flat flange margin on the polygonal and generally square blank of sheet material used in the drawing process for hold-down purposes in order to avoid uneven drawing-in of the blank and thus wrinkling or buckling of the drawn contours adjacent to the drawing area periphery. The hold-down flange has in the prior practice been trimmed off to the extent necessary entirely around the blank to provide the desired ultimate marginal flange structure and more particularly retaining finger extensions. In this connection, reference is made to my Patent No. 2,707,449 issued May 3, 1955, in which in the initial phases of the method the use of a blank providing a hold-down flange entirely around the blank and then trimming away of unneeded portions of the flange is alluded to.

I have endeavored to effect improvement in the prior method to substantially eliminate trim scrap except for corner portions of the originally square blank and from which corner portions the retaining flange or finger extension structure of the cover is derived, while the mill cut ends or edges of the blank are retained in the marginal flange structure of the cover between the retaining finger extensions.

A problem has been that the pulling-in of the blank during circular drawing of the body portion of the cover, there has been an undue tendency of the draw ring rib structure of the dies to wear unevenly due to greater resistance to pulling-in of the material in line with the corners than between the corner portions of the blank.

I have now discovered that this problem not only can be eliminated but in the elimination new and unexpected results and advantages have been attained, by pre-trimming the corners of the square sheet metal blank but still leaving enough marginal extension of the corner material to provide for the retaining finger structure to be derived therefrom. By this simple expedient, the resistance to draw-in in line with the material remaining from the corners of the blank is so greatly reduced that uneven draw ring wear is substantially eliminated and actually much thinner material than heretofore can be drawn successfully with relatively deep draws.

It is accordingly, an important object of the present invention to provide an improved method of drawing sheet metal wheel covers of the marginal retaining finger type.

Another object of this invention is to improve the method of drawing wheel covers which will not only minimize scrap losses but which will facilitate drawing with minimum wear of the drawing dies.

A further object of the invention is to provide an improved method of drawing sheet metal wheel covers which enables the use of thinner material than prior methods.

Yet another object of the invention is to provide substantial improvements in the method of drawing circular sheet metal wheel covers in such closely dimensioned blanks that trimming is eliminated in at least a substantial portion of the periphery of the blank.

Other objects, features and advantages of the present invention will be readily apparent from the following detailed description of a preferred embodiment thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary radial sectional detail view taken substantially on the line III—III of FIGURE 1;

FIGURE 4 is a fragmentary plan view of a sheet metal blank following the first draw but which blank has thereon untrimmed corner portions;

FIGURE 5 is a plan view of a similar blank but showing the same as pre-trimmed at the corners;

FIGURE 6 is a plan view of a strip of material from which the blanks are derived;

FIGURE 7 is a fragmentary radial sectional detail view taken substantially on the line VII—VII of FIGURE 5;

FIGURE 8 is a plan view of a blank after first draw substantially similar to FIGURE 5 but showing a slight modification;

FIGURE 9 is a plan view of the blank of FIGURE 5 after a restrike draw operation;

FIGURE 10 is a side elevational view of the blank as shown in FIGURE 9;

FIGURE 11 is a fragmentary radial sectional detail view taken substantially on the line XI—XI of FIGURE 9;

FIGURE 12 is a sectional view similar to FIGURE 11 but showing the blank after a further drawing operation; and FIGURE 13 is a sectional view of the cover after completion.

Referring first to FIGURES 1, 2 and 3, a wheel cover 15 made according to the method of the present invention is constructed and arranged to be applied to the outer side of a vehicle wheel in press-on, pry-off relation. The wheel comprises a disk spider wheel body 17 supporting a tire rim 18 of the multi-flange, drop center type adapted to support a pneumatic tire 19 which may be of the tubeless type or may be a tire and tube assembly, as preferred. An intermediate generally radially inwardly facing and axially extending annular flange 20 of the tire rim merges with a generally radially outwardly and then axially outwardly turned terminal flange 21, and provides a seat for the bead of the tire 19.

The wheel cover 15 comprises preferably a one-piece sheet metal circular drawn member having self-retaining means for engagement with the wheel. To this end, the cover is made from thin, cold work hardenable material such as brass or stainless steel sheet, a suitable material in practice comprising 301 nickel stainless steel which may be of as thin as about .016 inch stock. Such stainless steel has a normal hardness of about 69 to 72 on the Rockwell B scale which, of course, is fairly soft. However, this material is readily cold workable to a hardness that must be measured on the Rockwell C scale, namely, approximately spring steel hardness and resultant resiliency.

Centrally the cover 15 may be variously contoured, being shown herein as provided with a fairly small axially outwardly projecting crown dome 22 having a radially outwardly extending contoured annular portion 23 thereabout leading into a generally axially outwardly projecting annular large rib-like portion 24, all such central portions of the cover overlying the wheel body 17.

About the annular rib body portion 24 is a deeply axially inwardly inset or dished intermediate portion 25 of a diameter substantially to overlie the juncture between the tire rim and the wheel body. At its radially inner side the dished portion 25 provides a generally axially outwardly and radially inwardly sloping or oblique annular wall portion 27 while at its radially outer side there is a generally radially and axially outwardly sloping or oblique annular outer marginal cover portion 28 that is dimensioned to overlie the tire rim 18.

On its outer marginal terminus the annular cover marginal portion 28 may be variously contoured but has a generally radially outwardly turned bead-like finishing and reinforcing formation 29 provided with an underturned generally radially inwardly extending annular flange 30 from which extends angularly, generally axially inwardly a series of preferably four cover retaining concealed resiliently flexible retaining finger extensions 31. These extensions are actually axially inwardly extending flanges of substantial segmental width and of circumferentially arcuate form disposed on a common circle that is slightly less than the inside diameter of the axially outer end portion of the intermediate flange 20, and of a length such that with the underturned flange 30 bottoming against the shoulder provided at juncture of the terminal flange 21 with the intermediate flange 20, the retaining finger extensions 31 extend to about midway axially inwardly opposite the intermediate flange.

At their terminal extremities, the retaining finger flanges 31 are subdivided by shallow arcuate cutouts 32 into short individual retaining fingers 33 which are, of course, connected for mutual resilient coaction in the finger extension flange 31 of which they form a part. Each of the retaining fingers 33 has a turned generally radially and outwardly oblique short and stiff gripping terminal 34 normally extending to a diameter slightly larger than the inside face diameter of the intermediate flange 20 and engageable in resiliently tensioned radially inwardly deflected edgewise generally biting relation against the inside face of the intermediate flange 20. By preference, the short stiff terminal flanges 34 are subdivided by shallow notches 35 into a plurality of tips providing substantial numbers of sharp corners that bite into the surface of the intermediate flange and resist turning of the cover.

In applying the cover 15 to the outer side of the wheel, a valve stem 37 is registered with a valve stem aperture 37a in the dished intermediate portion 25 of the cover and the cover then pressed inwardly which causes the stiff retaining finger terminals 34 to cam axially inwardly along the inside face of the intermediate flange 20. By radially inward compression of the terminal 34, the individual retaining fingers 33 are flexed radially inwardly and develop substantial resilient radially outward thrust on the biting tips of the terminals to so grip the intermediate flange as to hold the cover against unintentional axial displacement. Removal of the cover can be effected by applying a pry-off tool behind the underturned flange 30 and applying pry-off force for slidably dislodging the retaining finger terminals 34 from the tire rim.

Due to their short length, as best seen in FIGURES 2, 11 and 12, as the individual retaining fingers 33 are placed under resilient tension, the retaining finger flange 31 of which they are a part is also placed under resilient tension which is reflected uniformly in the retaining fingers 33 for positive retaining thrust of the retaining terminals 34 against the rim flange. Enhancement of such resilient thrust of the retaining fingers is attained by having the respective opposite sides of the finger extension flange portions 31 provided with widely tapering outer side portions 38 merging with the underturned flange 30 in each instance.

As shown in FIGURE 3, that portion of the flange 30 intermediate adjacent ones of the preferably four retaining finger flange extensions 31 may be provided with a short generally axially extending portion 30a into which the tapering side portions 38 of the retaining finger extensions 31 merge thereby mutually connecting the finger extensions for enhanced resilient tensioning. This intermediate extension portion 30a may be omitted, if preferred where the flange 30 and the junctures of the retaining finger extension 31 with the flange portion 30 shoulder against the marginal portion 28 as seen in FIGURE 2.

An advantage of the present cover arising from the close dimensioning of the initial blank resides in that all of the edges of the flange portions 30a between the sides 38 of the finger extension flanges 31 are substantially free from sharp fins or burrs or cutting points so that the present cover is safer to handle than would otherwise be the case. Herein this is attained by having all of such edges comprise mill cut or straight sheared and draw worked rather than die cut. By "mill cut" is meant, of course, the condition of the edges as they occur in the strip stock as supplied by the mill from which the thinly rolled stock is derived, the equivalent condition also occurring where the edges are the result of shearing off blanks straight across in separating the blanks successively from the strip. Such mill cut edges are generally initially susbstantially smooth and burr free, and the working and stretching of such edges in the course of drawing the cover further aids in smoothing the edges. On the other hand, the edges of the retaining finger terminals 34 are die cut and thus fairly sharp and even possibly containing burrs since these are, if anything, an asset for wheel flange gripping, biting cover retaining engagement.

In attempting to practice the method of making wheel covers from minimum size square blanks B of the sheet metal, that is of minimal dimensions so that as drawing of the cover progresses the only scrap that need be trimmed off will be in corner portions C of the blank, I first left the entire corner portions on the blanks, as shown in FIGURE 4. In the first draw to which the blank is subjected, all of the circular contours of the cover body are substantially completed, including the deeply dished intermediate portion 25, which causes the radially inward drawing of the margin of the blank between appropriate hold-down die members including draw ring structure serving to afford a generally equalizing effect on the pull-in around the entire perimeter of the circular draw form of the die structure and also to cold work harden the marginal material as it is pulled inwardly. At the conclusion of the first draw, it will be observed that those portions of the blank which were at the sides midway between the corners are drawn in at E close to the circular drawn perimeter, with the sides of the corners C curved toward the intermediate drawn-in edge portions E. While those portions of the corner areas contiguous the drawn perimeter, and which where gripped between the hold-down die members, appear reasonably smooth, those portions of the corners C outwardly therefrom show strong generally radial buckled distortions or strain ripples, fairly shown within the limits of line drawing illustration at L. These strain ripples result from crowding in of the material of the corners as it is drawn toward the drawing perimeter with a consequent contraction of the corner sides as the drawing progresses. The depth and length of the strain ripples indicates rather severe resistance of the corners C to drawing in. This resistance has been reflected in untimely wear of especially the bead of the draw ring portions of the dies generally aligned with the side portions of the corner portions C of the blank. This factor has also placed a limit upon the gauge and grain structure of material that could be drawn, any material under .018 inch thickness not having sufficient mass irrespective of grain structure to withstand the strain in the drawn contours of the cover and thus being subject to strain rupture.

I have discovered that greatly improved results are attained by properly trimming off excess material of the corners before subjecting the blank to drawing. Highly satisfactory results have been obtained by trimming from what normally would be a square blank B', as shown in FIGURE 5, the maximum amount possible of corner portions C' to leave on the corner areas of the blank marginal portions M of minimum practical width relative to the circular draw perimeter. This is effected by shearingly trimming off along predetermined respective lines N the unwanted portions of the corner portions C' which at their respective opposite ends run out at the respective sides of the blank B' bounding the corner portion in each instance.

Further improvement in the results attained by the present method accrue from having the trim or shear-off lines N on a radius substantially concentric with the draw perimeter circle to reduce pull-in resistance. As a result of this, I find that during drawing of the blank there is exceptionally uniform concentric pulling in of marginal portions M so that the corner trim edges O remain substantially concentric with the draw perimeter. This so uniformly distributes pulling-in forces, pressures and stresses that throughout the corner margins M there is very little if any stress wrinking, or at least any tendency toward mild wrinkling or warpage during circumferential contraction of the corner margins is easily, smoothly and with minimum ironing pressure counteracted so that the corner margins M are maintained uniformly flat and of equal length throughout their width as defined by the trim edges O which remain substantially concentric with the draw perimeter of the blank.

As striking evidence of the material relief of pull-in resistance resulting from the corner trim-off of the present method, I find that thinner stock can be drawn without rupture. Satisfactory results have been obtained where .016 to 0.17 inch stainless steel stock has been used, while such stock almost invariably has ruptured previously due to severe localized stretching due to draw-in resistance of the marginal material in the corner areas of the blank. Use of such lighter gauge material is extremely advantageous as an economy measure. Also, reducing the over-all weight of the covers, is a desirable advance because there is not only a desirable weight reduction and thus less tendency for covers to be thrown due to wheel impacts in service, but also less centrifugal tendency of the covers to turn relative to the associated wheels, as well as desirable resilient flexibility of the covers to adapt to weaving motions or movements in the wheels so that there is a reduced tendency of covers to work off of the wheels in service.

Provision of the corner trimmed blanks B' in production is readily effected by feeding strip material from a roll supplied by the rolling mill in the proper width to provide mill edges on the blanks which require no trimming off but become the edges E of the drawn blank. As shown in FIGURE 6, a strip of the sheet material is trimmed out along convergently related pairs of the trim lines N to separate the corner portions C' relative to successive adjoining blanks and to form the curved corner edges O on the blanks. In making the trim out shear cuts N, the respective ends of the cut lines are turned as nearly as practicable to run out normal to the straight side edges of the blank as indicated at P. At the connecting neck between the leading blank and the next succeeding blank portion of the strip, the turned run-out ends P join on a radius which is bisected when the leading end blank B' is sheared from the strip on entry into or in the press in which the blank is drawn to shape in the first draw to which it is subjected. The turned run-out ends P avoid tendency to warp the edge of the blank where the cut out shear lines N intersect the mill edges of the blank. This is highly desirable since such mill edges remain without further trimming in the finished article.

Inasmuch as the combined corner sections C' afford substantial solid metal area it is advantageous to use the same for drawing small useful articles, which can be accomplished in suitable press equipment located before the stock strip is fed into the cover drawing press. The small article forms drawn in the areas C' can be blanked out of the areas before the areas C' are shear trimmed as scrap along the trim lines N. Further economies are thus effected since what might otherwise be entirely scrap is utilized in large percentage for useful, productive purposes.

Even further strain-relief can be effected with respect to the draw-in ease of movement of the corner marginal portions M of the blank by arcuately centrally indent cutting out shallow portions within the respective edges O to provide cut out edges Q (FIG. 8) whereby the length of the corner sections M is reduced centrally of the width of the respective sections, in this instance comprising approximately ⅓ of the total width of the corner marginal portion M. This also, of course, increases the available material for useful article production in the corner trim-out portions C'.

At the conclusion of the first draw, the circular contours of the cover body are substantially completed as shown in FIGURES 5 and 7, inclusive of the deeply dished annular intermediate cover portion 25, and the radially outer annular sloping portion 28 merges into an annular small radius and at this point shallow rib R having entirely annularly thereabout a reversely bent shallow, small radius groove defined by an oppositely projecting rib S on the draw perimeter and from which the corner marginal portions M project. The rib R projects toward the axially outer side of the cover form and the rib S projects toward the axially inner side of the circular cover form. The reverse bent perimeter rib S is formed by the draw bead rib of the draw die assembly. It will be noted that the mill edges E substantially coincide with the perimeter extremity or diameter defined about the radially outer side of the reverse bent, draw ring formed groove rib S. During the first draw, more over, substantially all of the material of the blank within the draw perimeter is stretched and cold work hardened, and especially in the marginal portion 28 and the ribs R and S.

Following the initial drawing as described, the drawn blank is subjected to a sizing or restrike drawing die operation wherein the contours of the crown 22 are completed. At this time, also, the marginal rib R is deepened by wiping down the reverse bent peripheral rib S into substantially cylindrical form to provide a lengthened radially outer side for the rib R, substantially as shown in FIGURES 9, 10 and 11, thereby providing an axial flange which is actually the subsequently underturned flange 30. At this time, the corner portions M of the blank margin are preferably still maintained flat as shown.

The flat corner marginal portions M of the blank are then trimmed away along predetermined finger terminal outline T. The principal burriness of the die trimmed edges occurs on the underside or axially inner side of the trimmed edges which, after the fingers are turned up, become the corners of the edges of the finger terminals that actually enter into biting engagement with the rim flange surface.

After the corner marginal portions M have been converted into the respective finger outline along the trim line T, the finger marginal areas are cold worked and straightened into longitudinally axially inwardly extending extensions of the annular wall portion 30 of the rib R as best seen in FIGURE 12. At this time, also, the retaining finger terminal flanges 34 are preferably turned up obliquely.

As the final step in shaping of the cover, the rib R is collapsed and turned generally radially outwardly to provide the turned out marginal extremity bead-like formation 29, as shown in FIGURE 13. At this time the outer side of the rib R is turned under and becomes the flange 30 overlying the finger extensions 31 and the diameter of the cover is defined by the radial extent to which the rib R is turned out. Following such completion of the cover shape, it is ready for polishing and buffing and plating, as desired, or any other desired finishing.

I claim as my invention:

1. In a method of drawing thin sheet metal wheel covers, trimming a quadrangular blank across the corners thereof to sever all but a predetermined corner marginal projection on the blank at each corner along trim lines that are turned toward substantially normal intersection with the straight bounding edges of the blank, drawing the blank into a draw perimeter of smaller diameter than the dimension across the straight edges of the blank and continuing the drawing until the straight edges of the blank are closely adjacent and substantially coincide with the diameter defined about the draw perimeter, and thereafter shaping the corner projections into cover retaining fingers, by trimming the same so that the side edges of the fingers run into the diameter defined by the drawn in edges of the blank.

2. In a method of drawing a thin sheet metal wheel cover in a polygonal blank originally having a plurality of corners with side edges between the corners having the centers thereof on a common diameter, trimming off said corners on respective radius lines and with the run out ends of the trim lines turned toward substantially normal intersection with the straight side edges of the blank, drawing the blank into a draw perimeter of smaller diameter than the dimension between the original side edges of the blank and continuing the drawing until the side edges of the blank are closely adjacent to and substantially coincide with the diameter of the draw perimeter and the corner edges have been drawn toward the perimeter an equal extent as said side edges, and thereafter shaping the corner projections into cover retaining fingers.

3. In a method of making wheel covers from thin sheet metal in polygonal blanks, cutting off corner portions of the blanks along trim lines including indent shallow cut out portions of the cut edges whereby to afford substantial drawing in relief for the corner portions, and drawing the blanks into a draw perimeter of a predetermined diameter smaller than the dimension between the original side edges of the blank and until said side edges are close to the draw perimeter and in such drawing uniformly pulling in said corner trim edges to a diameter intermediate the draw perimeter and the trim diameter of the corner portions.

4. In a method of drawing a thin sheet metal article in a polygonal blank originally having a plurality of corners with side edges between the corners having the centers thereof on a common diameter, trimming off said corners on respective radius lines and with the run out ends of the trim lines turned toward substantially normal intersection with the straight side edges of the blank, drawing the blank into a draw perimeter of smaller diameter than the dimension between the original side edges of the blank and continuing the drawing until the side edges of the blank are closely adjacent to and substantially coincide with the diameter of the draw perimeter and the corner edges have been drawn toward the perimeter an equal extent as said side edges, and shaping the corner projections.

5. In a method of making a circular wheel cover member from thin sheet metal, providing a quadrangular sheet metal blank, trimming corner projections on the blank to a shortened corner marginal projection length in each instance and on a diameter substantially greater than a predetermined draw diameter which is smaller than the dimension across the straight sides of the blank and with the run out ends of the trim lines turned toward substantially normal intersection with the side edges of the blank, drawing the blank uniformly radially inwardly into said draw diameter until the straight sides of the blank are closely adjacent to and substantially coincide with said diameter so as to enable subsequent drawing of the sides without trimming, at the same time drawing the corner marginal projections toward but extending beyond said diameter and with their edges on a smaller diameter than the trim off diameter, in the drawing shaping the perimeter margin of the draw diameter into a pair of contiguous concentric narrow small radius adjoining ribs having a common wall, with the radially outer of said ribs projecting from one face of the cover blank and the radially inner of the ribs projecting from the opposite face of the cover blank, drawing said radially outer rib and the untrimmed contiguous side edges of coinciding diameter in the direction of projection of said radially outer rib into a generally cylindrical flange including said common wall and thereby offsetting the marginal corner projections substantially relative to the radially inner of the ribs, thereafter working said corner marginal projections axially inwardly into the diameter of the cylindrical annular flange and shaping cover retaining finger terminal means on the ends of said thus worked extensions, and finally turning the radially inner rib radially outwardly into overlying relation to the retaining finger terminals and increasing the diameter of the shaped cover.

References Cited in the file of this patent

UNITED STATES PATENTS

| | | |
|---|---|---|
| 1,533,438 | Main | Apr. 14, 1925 |
| 1,768,294 | Reid | June 24, 1930 |
| 1,841,920 | Smith | Jan. 19, 1932 |
| 1,891,316 | Nyberg | Dec. 20, 1932 |
| 1,944,658 | Griffith | Jan. 23, 1934 |
| 2,674,787 | Lyon | Apr. 13, 1954 |
| 2,707,449 | Lyon | May 3, 1955 |